UNITED STATES PATENT OFFICE.

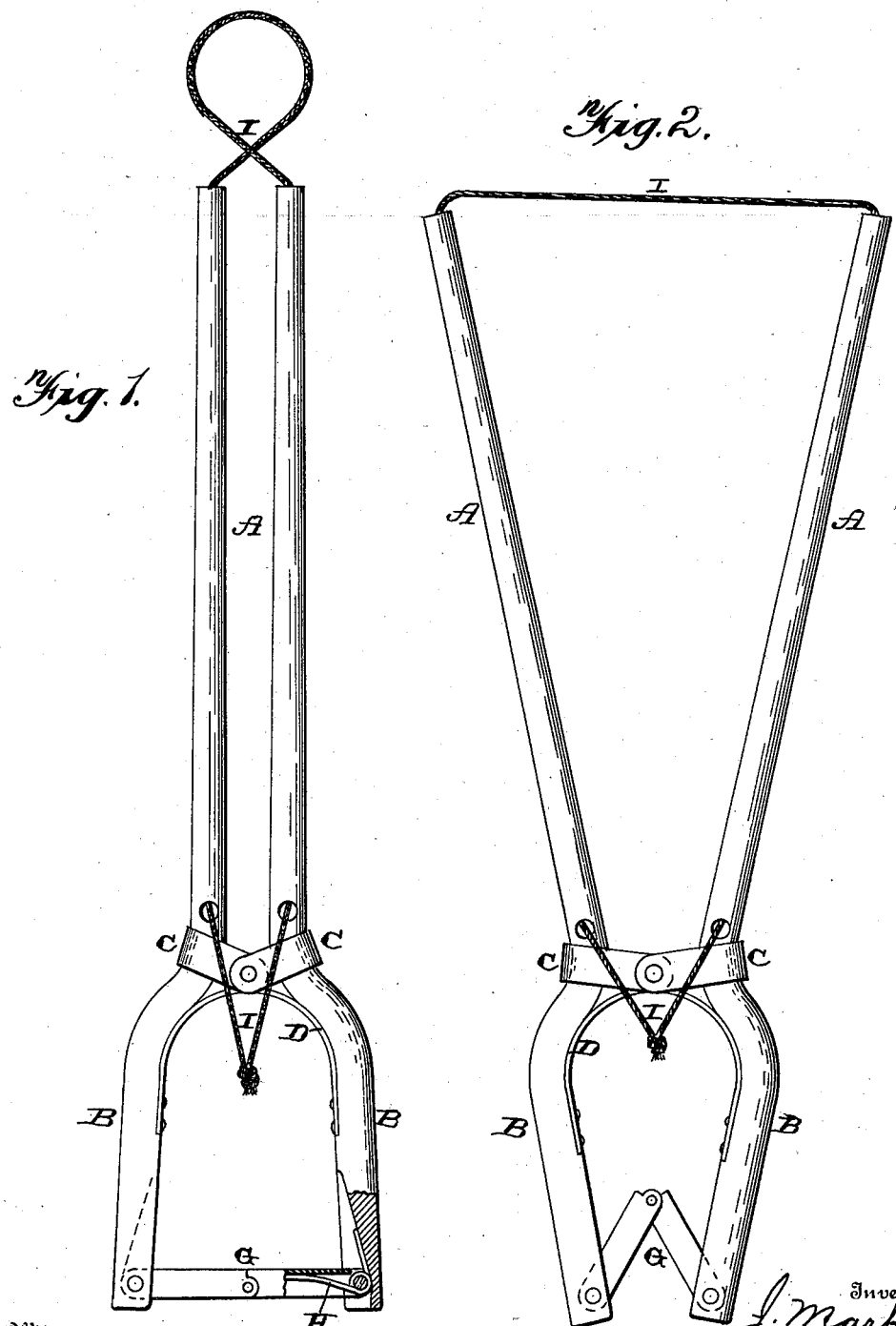

JACOB MARKUS, OF HARRISON, SOUTH DAKOTA.

VETERINARY OBSTETRICAL INSTRUMENT.

SPECIFICATION forming part of Letters Patent No. 655,257, dated August 7, 1900.

Application filed April 13, 1900. Serial No. 12,711. (No model.)

*To all whom it may concern:*

Be it known that I, JACOB MARKUS, a citizen of the United States, residing at Harrison, in the county of Douglas and State of South Dakota, have invented certain new and useful Improvements in Obstetrical Instruments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in obstetrical instruments; and it consists in two pivoted spring-actuated hollow levers, through which the delivery-cord is passed, combined with the cord, and a locking mechanism placed between the outer ends of the levers, as will be more fully described hereinafter.

Figures 1 and 2 represent side elevations of a device embodying my invention, one showing the parts closed and the other the parts opened.

A represents two straight smooth tapering hollow levers, which are provided at their inner ends with the curved handles B. These levers are loosely connected together, so as to have an opening-and-closing movement in relation to each other by means of the plates C, which are placed at an angle to each other, and which plates are fastened rigidly to the levers, but are pivoted together at their inner ends. Between the inner ends of the handles is placed a suitable spring D for keeping the levers normally close together. Between the inner ends of the levers are placed the two links G, one of which has a spring H coiled around the pivot by which it is secured to the handle, and which links are intended to lock the levers in a closed position, so that no pull upon the levers will cause them to open and so as to enable the instrument to be used with one hand. The inner ends of the links are so formed that they readily fold together in order to allow the outer ends of the two levers A to be separated and as the levers close to move backward in a straight line, so as to form a safe and effective lock for keeping the outer ends of the two levers in contact with each other. Passing through the two levers from points near their pivots are suitable openings, and through these openings is passed the cord I, by means of which the young animal is to be delivered. This cord is made sufficiently long to be adjusted back and forth, and thus enable a loop to be formed at the outer ends of the levers sufficiently large to pass over the young animal's head. A cord is used not only because it is more easily manipulated and adjusted then, but because it is easier and less cruel upon the little animal to which it is applied. After the loop has been placed around the animal's neck and after the levers have been allowed to close and before drawing the cords up tight the instrument should be turned or twisted one-half way around, which will cause the loop to cross at the outer ends of the levers, as shown in Fig. 1, and when drawn up tight will cause the levers to draw toward each other instead of separating. The young animal's head will be caught in the loop formed at the outer ends of the levers, and then by contracting the loop at the outer ends of the levers by pulling upon the loop at its opposite end and where it extends through the levers the animal is extracted.

Having thus described my invention, I claim—

1. In an instrument of the character described, the two pivoted spring-actuated hollow levers, combined with a cord which is passed through the levers, substantially as shown.

2. In an instrument of the character described, the two pivoted hollow spring-actuated levers, and the cord which is passed through the levers, combined with a locking device at the outer ends of the handles, for holding the levers in a closed position, substantially as described.

In testimony whereof I affix my signature in presence of two witnesses.

JACOB MARKUS.

Witnesses:
GEO. E. CULVER,
J. W. BORDEWYK.